United States Patent
Shastri et al.

(10) Patent No.: US 8,340,529 B2
(45) Date of Patent: Dec. 25, 2012

(54) HDMI TMDS OPTICAL SIGNAL TRANSMISSION USING PAM TECHNIQUE

(76) Inventors: Kalpendu Shastri, Orefield, PA (US); Bipin Dama, Bridgewater, NJ (US); Vipulkumar Patel, Breinigsville, PA (US); Mark Webster, Bethlehem, PA (US)

( * ) Notice: Subject to any disclaimer, the term of this patent is extended or adjusted under 35 U.S.C. 154(b) by 382 days.

(21) Appl. No.: 12/813,562

(22) Filed: Jun. 11, 2010

(65) Prior Publication Data

US 2010/0316388 A1    Dec. 16, 2010

Related U.S. Application Data

(60) Provisional application No. 61/186,821, filed on Jun. 13, 2009.

(51) Int. Cl.
 *H04B 10/12* (2006.01)
(52) U.S. Cl. ........................................ 398/141
(58) Field of Classification Search .................. 398/141, 398/185
 See application file for complete search history.

(56) References Cited

U.S. PATENT DOCUMENTS

| | | | |
|---|---|---|---|
| 7,347,632 B2 | 3/2008 | Farr | |
| 7,363,575 B2 | 4/2008 | Chung | |
| 7,371,014 B2 | 5/2008 | Willis et al. | |
| 7,394,406 B2 | 7/2008 | Pasqualino | |
| 7,394,989 B2 * | 7/2008 | Ozeki et al. | 398/141 |
| 7,460,031 B2 | 12/2008 | Yeo et al. | |
| 7,483,597 B2 | 1/2009 | Shastri et al. | |
| 7,549,000 B2 | 6/2009 | Lin et al. | |
| 7,706,691 B2 | 4/2010 | Lin et al. | |
| 7,860,398 B2 * | 12/2010 | Tatum et al. | 398/141 |
| 2007/0233906 A1 | 10/2007 | Tatum et al. | |
| 2008/0008470 A1 | 1/2008 | Lin et al. | |
| 2008/0126591 A1 | 5/2008 | Kwon | |
| 2008/0201756 A1 | 8/2008 | Shakiba et al. | |
| 2008/0270635 A1 | 10/2008 | Nakahama | |
| 2009/0115911 A1 | 5/2009 | Lida et al. | |
| 2009/0116583 A1 | 5/2009 | Lida et al. | |
| 2009/0278984 A1 | 11/2009 | Suzuki et al. | |
| 2010/0043045 A1 | 2/2010 | Shakiba et al. | |
| 2010/0122135 A1 | 5/2010 | Lida et al. | |

* cited by examiner

*Primary Examiner* — Shi K Li
(74) *Attorney, Agent, or Firm* — Wendy W. Koba

(57) ABSTRACT

An HDMI interconnect arrangement is presented that performs a pulse-amplitude modulation (PAM) conversion of the TMDS audio/video signals in order to simultaneously transmit all three channels over a single optical fiber. The set of three audio/video TMDS channels is applied as an input to a PAM-8 optical modulator, which functions to encode the set of three channels onto an optically-modulated output signal. The modulated optical signal is thereafter coupled into an optical fiber within an active HDMI cable and transmitted to an HDMI receiver (sink). The TMDS CLK signal is not included in this conversion into the optical domain, but remains as a separate electrical signal to be transmitted along a copper signal path within the active HDMI cable.

6 Claims, 2 Drawing Sheets

HDMI TMDS OPTICAL SIGNAL TRANSMISSION USING PAM TECHNIQUE

CROSS-REFERENCE TO RELATED APPLICATIONS

This application claims the benefit of U.S. Provisional Application No. 61/186,821, filed Jun. 13, 2009 and herein incorporated by reference.

TECHNICAL FIELD

The present invention relates to an HDMI interconnect arrangement and, more particularly, to an optical fiber-based HDMI interconnect for use with TMDS signals that performs a PAM-8 conversion of the TMDS data channel signals in order to simultaneously transmit all three channels over a single optical fiber.

BACKGROUND OF THE INVENTION

HDMI is a specification that integrates audio and video information into a single digital interface to be used with, for example, digital video disc (DVD) players, digital television (DTV), high definition TV (HDTV), set-top boxes, and other audio and/or video devices. An HDMI interface cable is configured to carry multi-channel audio data, as well as standard and high definition consumer electronics video formats. Content protection technology is also available and an HDMI cable may be configured to carry control and status information in both directions.

Transition minimized differential signaling (TMDS) is a signaling technique used in HDMI to produce a transition-controlled, DC-balanced series of symbols from the audio and video inputs. TMDS is more properly a way of encoding the audio and video digital information to protect it from degrading as it travels along the length of the HDMI cable, creating data channels associated with the three original colors (RGB)/intensity aberration (YPbPr), defined as TMDS channels 0, 1 and 2, as well as a video pixel clock, defined as TMDS CLK. In a long string of logic zeros and logic ones, bits are selectively manipulated in TMDS in order to keep the DC voltage level of the overall signal centered around a particular signal threshold. Another signal threshold at the receiver is then used to determine whether a received data bit is at a voltage level equivalent to a logic zero (0) or at a level equivalent to a logic one (1).

FIG. 1 illustrates a conventional prior art implementation of an HDMI system, showing an HDMI source 1 and an HDMI sink 2, coupled together via an HDMI cable 4. Within HDMI source 1, the associated video and audio input signals are applied to an HDMI transmitter 3, which transforms these signals into a set of three signals along TMDS channels 0, 1 and 2, and a separate TMDS CLK signal. The TMDS CLK signal will be used by HDMI sink 2 as a frequency reference for data recovery on the three audio/video channels. In the particular arrangement shown in FIG. 1, this set of four signals are transmitted as simplex signals (i.e., "one-way" transmissions) along copper wires within a standard HDMI cable 4 and transmitted to HDMI sink 2. Other copper wires within HDMI cable 4 are used to support half-duplex transmission (i.e., "two-way" transmission at different times for each direction) of various other signals used in HDMI signaling (DDC, CEC, VDD, GND, etc.). The simplex transmission wires supporting the TMDS signals are thereafter coupled, as shown in FIG. 1, into an HDMI receiver 5 that functions to re-convert the TMDS signals into the proper video and audio signals (as well as the recovered clock signal).

In many conventional transmission/reception systems using HDMI, cable 4 comprises a purely electrical cable (usually composed of copper wires). However, there are major drawbacks associated with the use of an electrical cable as a result of its susceptibility to electromagnetic interference, mainly due to the limited bandwidth of the copper wire. Furthermore, the signals transmitted along copper wire are susceptible to power loss, thus limiting the length of copper-based electrical HDMI cables to less than about 15 meters.

It has been previously suggested to replace copper-based HDMI cables with optical fiber-based HDMI cables. By virtue of using an optical cable, the data rate and cable span may both be significantly increased while avoiding the problems of copper wire. Specific arrangements of these optical fiber-based alternatives are disclosed in U.S. Published Application No. 2007/0233906, published on Oct. 4, 2007. To date, however, these solutions pose their own limitations in supporting the transmission of the multiple TMDS channels. One solution is to use separate fibers for each channel, another solution is to use separate wavelengths for each channel. Either of these solutions introduces additional components and/or sources of loss into the system, increasing its complexity and cost. Another proposed solution is to "serialize" the set of TMDS channels prior to transmission over a single fiber, and then "deserialize" the data at a receiver unit (a technique referred to in the art as SERDES). The proposed SERDES solution, however, creates other problems in terms of requiring the HMDI connection to operate at three times the data rate of the individual channels (for example, at 10.2 Gbps as compared to 3.4 Gbps) and as a result requires the use of expensive, high bandwidth components that may consume more power than their lower speed counterparts.

Thus, a need remains for a optical fiber-based HDMI cable that addresses the concerns of the multiple fiber/multiple wavelength arrangements without requiring the use of more complex components associated with SERDES operations.

SUMMARY OF THE INVENTION

The need remaining in the prior art is addressed by the present invention, which relates to an HDMI interconnect arrangement and, more particularly, to an optical fiber-based HDMI interconnect for use with TMDS signals that performs a pulse-amplitude modulation (PAM) conversion of the TMDS audio/video signals in order to simultaneously transmit all three channels over a single optical fiber.

In accordance with the present invention, the set of three audio/video TMDS channels is applied as an input to a PAM-8 optical modulator, which functions to encode the set of three channels onto an optically-modulated output signal. The modulated optical signal is thereafter coupled into an optical fiber within an active HDMI cable (where an "active" HDMI cable is defined as a cable including both optical fibers and copper wires and necessary optical-to-electrical (O/E) conversion components), and is transmitted to an HDMI receiver (sink). The TMDS CLK signal is not included in this conversion into the optical domain, but remains as a separate electrical signal to be transmitted along a copper signal path within the active HDMI cable. The PAM-8 signal propagating along the optical fiber is then recovered at an HDMI sink and decoded (using the separately-transmitted TMDS CLK signal) to reconstruct the set of three TMDS channels. Known HDMI receiver techniques are then used to translate the channels into the desired video and audio information.

The utilization of PAM-8 modulation to transmit TMDS channels in accordance with the present invention eliminates the need for extra fibers or extra wavelengths (as used in the prior art), while also maintaining the original data rate of the TMDS data and thus avoiding the need for high-speed electronics (as used in the SERDES-based prior art arrangement). Advantageously, the active HDMI cable formed in accordance with the present invention may be used as a direct replacement for conventional electrical HDMI cables (or as a replacement for the various types of active HDMI cables described above).

In one embodiment, the active HDMI cable connection of the present invention utilizes multimode fiber, which is relatively inexpensive while still providing sufficient bandwidth to extend the distance over which HDMI signals may travel when compared to the conventional copper HDMI cable. In an alternative embodiment, single mode fiber may be used and is considered to be preferred when transmitting the signals over distances in excess of 100 meters (compare to the 15 meter limitation of HDMI copper cable). The fiber itself may comprise either a suitable glass or plastic material.

In accordance with one embodiment of the present invention, a Mach-Zehnder interferometer (MZI) is utilized as an optical modulator to directly create the PAM signal in the optical domain. In this case, the original TMDS data channels are first phase aligned to form clocked data streams, with the clocked data then applied as the electrical input signals to the optical modulator. Indeed, the clocked data may be further encoded to create an N-level input signal (N>3) and a multi-segment modulator utilized to improve the linearity of the response over the range of phase modulation.

Alternatively, a vertical cavity surface-emitting laser (VCSEL) may be directly modulated with the phase-aligned data signals to create the PAM-8 optical output signal.

In accordance with another embodiment of the present invention, the TMDS-to-PAM conversion may be performed in the electrical domain, with the PAM-8 electrical signal thereafter converted into an optical signal.

Other and further embodiments and advantages of the present invention will become apparent during the course of following discussion and by reference to the accompanying drawings.

BRIEF DESCRIPTION OF DRAWINGS

Referring now to the drawings.

DETAILED DESCRIPTION

As mentioned above, there are various factors limiting the performance of HDMI cables, whether a pure electrical cable or a combination of optical fibers and copper wires (i.e., an "active" HDMI cable). The fiber-based connection of the present invention addresses these concerns by providing the ability to simultaneously transmit all three channels of the TMDS data signals over a single optical fiber without the use of multiple wavelengths or SERDES components by, instead, performing a pulse amplitude modulation (PAM) conversion on the TMDS data channels and transmitting the PAM signal over an optical fiber.

Figure 1:
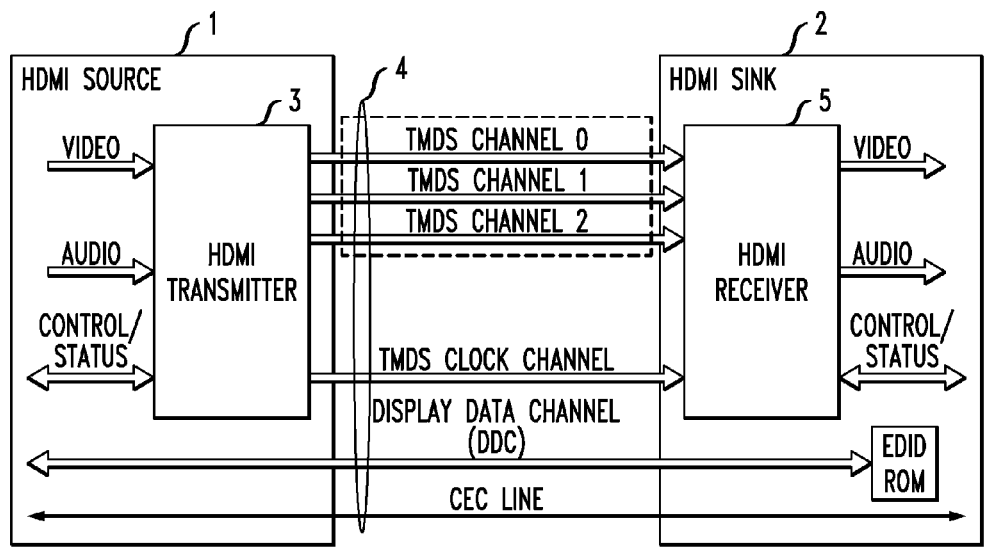
FIG. 1 is a block diagram of a prior art implementation of an HDMI source and sink, with a conventional HDMI cable connecting the source and sink, the diagram showing in particular the utilization of TMDS coding to transmit the video and audio signals.
Figure 2:
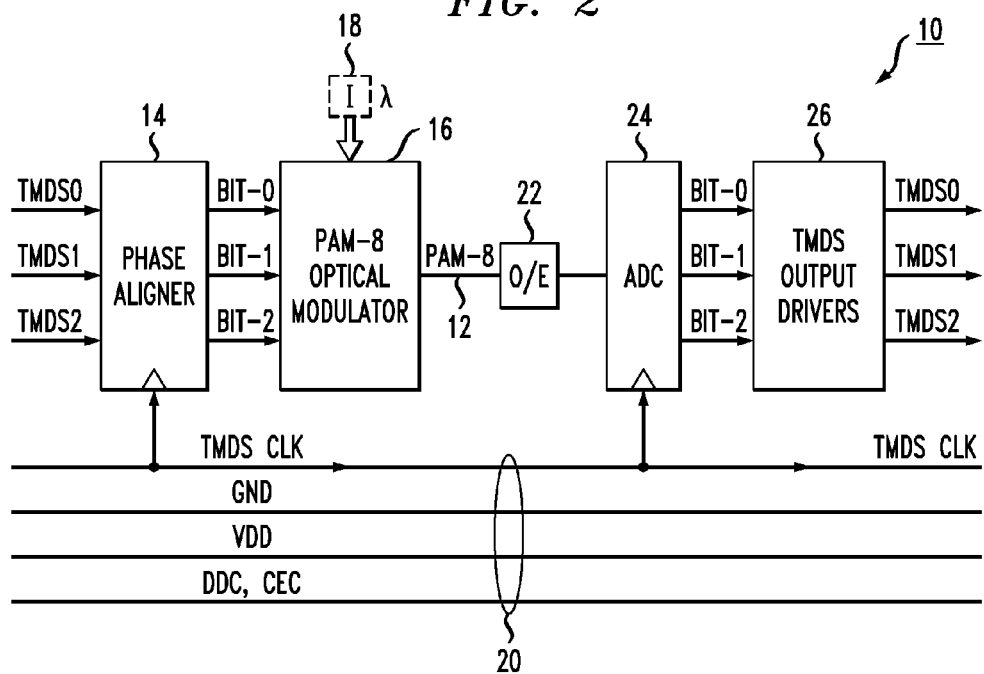
FIG. 2 illustrates an exemplary PAM-encoded optical fiber-based arrangement utilized to transmit HDMI TMDS signals along an active HDMI cable in accordance with the present invention.

Reference is made to FIG. 2, which illustrates an active HMDI cable connection 10 that is proposed for use in place of HDMI cable 4 of the prior art. As will become apparent during the course of the following discussion, inventive HDMI cable connection 10 may be used as a direct replacement for existing HDMI cables (electrical cables or active cables) deployed in various systems. Referring to FIG. 2, active HDMI cable connection 10 is shown as including an optical fiber 12 to transmit channels 0, 1 and 2 of the TMDS data (these three channels are shown in a dotted box in FIG. 1) as a PAM-8 optical signal. In particular, TMDS channels 0, 1 and 2 as created by HDMI transmitter 3 (see FIG. 1) are first applied as an input to a phase alignment element 14 (which may comprise, for example, a D-type flip-flop circuit arrangement). The operation of phase alignment element 14 is controlled by TMDS CLK to create a set of aligned data signals, shown as bit-0, bit-1 and bit-2, at the output of phase alignment element 14.

The phase-aligned streams represented as bit-0, bit-1 and bit-2 are then applied as separate electrical inputs to an optical pulse amplitude modulator 16. A continuous wave (CW) optical source 18 operating at a known wavelength λ is used to supply an optical input signal I to modulator 16. As will be described below, modulator 16 functions to create a pulse amplitude modulated (PAM) optical output signal that is representative of the values of the original three electrical input signals—that is, representative of TMDS channels 0, 1 and 2. In this case, a PAM-8 configuration is utilized, meaning that a total of 8 different amplitude levels are required to completely define all the various possibilities of the three digital input streams.

The output PAM-8 optical signal from modulator 16 is thereafter applied as an input to an optical fiber 12, where optical fiber 12 is defined as one component of active HDMI cable connection 10. The remaining signals, including TMDS CLK, ground, power, and the like, are transmitted in electric form over copper wires 20 also included in active HDMI cable connection 10. The use of an active HDMI cable including both copper and fiber for connection 10 allows for the phase alignment, encoding and decoding at both the transmit and receive sides of the cable to be simplified, without sacrificing on the distance travelled by the signals, the signal integrity, or requiring additional/complicated circuitry to perform signal processing/filtering to removing timing jitter. Indeed, by using this technique of transmitting only the TMDS channels 0, 1 and 2 over an optical fiber, the electronics continue to operate at the 3.4 Gbps rate, as compared to the 10.2 Gbps rate required for the SERDES implementation mentioned above.

At the receive side, the PAM-8 signal propagating along optical fiber 12 is first re-converted into the electrical domain within an optical-to-electrical (O/E) conversion device 22 and then applied as an electrical input to a 3-bit A/D converter 24 to recover the digital data signals bit-0, bit-1 and bit-2, as controlled by the received (electrical) TMDS CLK signal. Thereafter, the clocked data bits are applied as separate inputs to a TMDS output driver 26 to recover the original three TMDS data channels.

Figure 3:
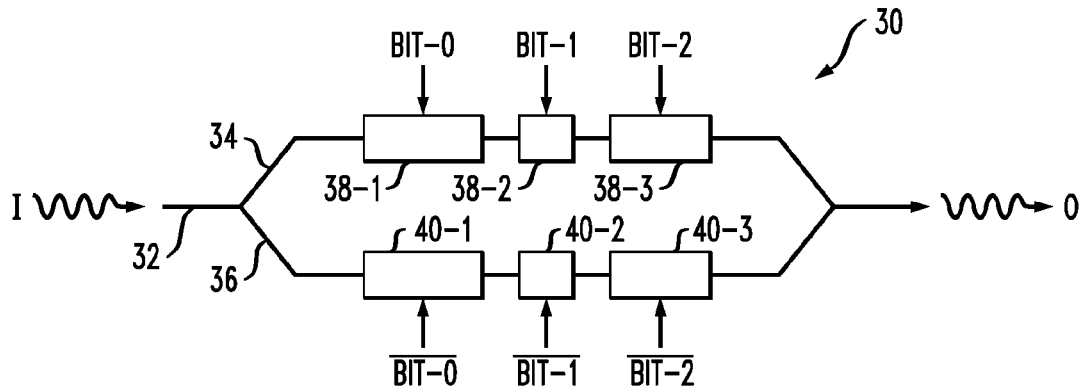
FIG. 3 illustrates an exemplary optical modulator configured to convert the 3-channel TMDS signals into an optical PAM-8 signal for transmission over a single optical fiber in the arrangement of FIG. 2.

FIG. 3 illustrates an exemplary PAM-8 optical modulator 16 that may be used to convert the phase-aligned bit-0, bit-1 and bit-2 representations of the TMDS data channels into a phase amplitude modulated optical output signal. In this particular embodiment, modulator 16 comprises a multi-segment Mach-Zehnder interferometer (MZI) 30. As shown, optical input signal I from source 18 is supplied to an incoming optical waveguide 32, which then splits along a pair of waveguide arms 34 and 36. In this case, a differential MZI is shown, with a plurality of segments formed along both waveguide arms 34 and 36. That is, a first set of segments 38-1, 38-2 and 38-3 are formed along waveguide arm 34 and a second set of segments 40-1, 40-2 and 40-3 are formed along waveguide arm 36.

Phase-aligned data streams defined as bit-0, bit-1 and bit-2 are shown as applied as the electrical inputs to segments 38-1, 38-2 and 38-3, respectively, with their inverse values similarly applied as inputs to segments 40-1, 40-2 and 40-3. The presence of these electrical signals will modify the properties of the optical signals propagating along arms 34 and 36, introducing a fixed amount of phase delay between the signals propagating along each arm as a function of the logic "0" or logic "1" values of each bit at each point in time. These optical signals thereafter recombine along an output optical waveguide 42 to form the PAM-8 optical output signal O. A complete discussion on the use of an MZI to create such a PAM optical output signal can be found in U.S. Pat. No. 7,483,597 issued to K. Shastri et al. on Jan. 27, 2009, assigned to the assignee of this application and hereby incorporated by reference.

Figure 4:
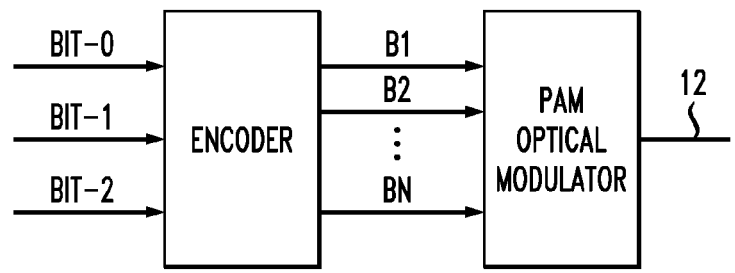
FIG. 4 shows an additional feature that may be utilized to increase the linearity of the output response by encoding the original three TMDS signals into a plurality of N phase-aligned bit streams used as the input to the PAM optical modulator.

It is also possible to further encode the phase-aligned set of three bit streams to create a plurality of N separate data bit streams and utilized the N separate streams as input to a PAM modulator. By increasing the number of electrical inputs (and also, perhaps, increasing the number of segments forming an MZI modulator), the PAM output signal will be defined at an increased level of precision by improving the linearity of the transfer function of the phase response. FIG. 4 illustrates this aspect of the present invention, where phase-aligned signals bit-0, bit-1 and bit-2 are first applied as inputs to an encoder 42 that is used to introduce an additional level of differentiation between the signals and generate an increased number of output (still phase aligned) data streams. In a simple arrangement, encoder 42 may generate a set of four output signals from the three input signals and an associated MZI would be formed to include an additional segment to receive the additional input.

While the arrangement of FIG. 3 illustrates an embodiment of the present invention utilizing an MZI optical modulator, it is to be understood that there are other types of optical arrangements that may also be used to create the PAM-8 output signal. For example, as mentioned above, a directly-modulated VCSEL source may be used to generate the desired PAM-8 optical output signal.

Figure 5:
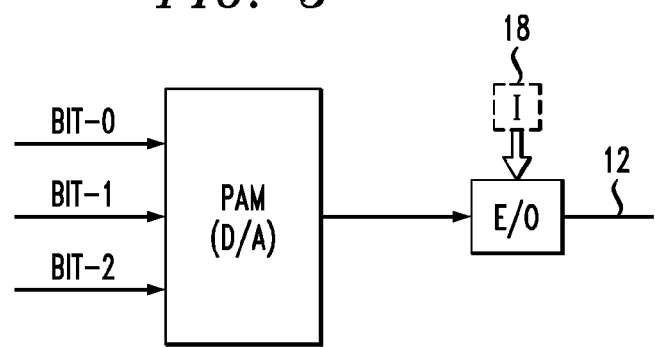
FIG. 5 illustrates an alternative configuration for the active HDMI cable of the present invention where the three TMDS data channels are first converted into an electrical PAM-8 signal, with the electrical PAM signal then transformed into the optical domain prior to transmission from the HDMI source to the HDMI sink.

As mentioned above, it is also possible to first create a PAM-8 signal in the electrical domain, directly from the phase-aligned bit-0, bit-1 and bit-2 signals. FIG. 5 illustrates this aspect of the present invention, where a digital-to-analog converter (DAC) 50 is used to create a PAM-8 output signal from the parallel bit streams. This electrical PAM-8 signal is then applied as an input to an electrical-to-optical (E/O) conversion element 52, which may simply comprise a lasing device. The output signal from E/O device 52 is therefore an optical version of the PAM-8 signal, which is thereafter coupled into optical fiber 12 in the same manner as described above.

When compared to implementations requiring the use of SERDES, the PAM-8 rate as used in the various embodiments of the present invention is much lower and enables the use of less expensive multimode fiber without any sacrifice in performance of the system. Indeed, the active HDMI cable of the present invention may be used as a plug-in replacement for any conventional HDMI cable already in use. Utilizing multimode fiber also has the extra benefit of providing greater tolerances for optical alignment, enabling lower cost, high volume manufacturing. The proposed arrangement of the present invention has the further advantage of extending the span over which the HDMI TMDS signals can travel to distances beyond 100 meters, depending upon the fiber type and various other operating parameters. Indeed, when using single mode fiber in place of multimode fiber, much greater distances can easily be achieved. The fiber itself will, in most cases, comprise a glass (silica-based) material. However, it is also possible to use certain polymer (plastic) materials in the formation of an optical fiber for this purpose.

While the present invention has been described with reference to different embodiments thereof, those skilled in the art will recognize that various changes may be made without departing from the spirit and scope of the claimed invention. Accordingly, the invention is not limited to what is shown in the drawings and described in the specification, but only as indicated in the claims appended hereto.

What is claimed is:

1. An active high definition multimedia interface (HDMI) cable connection for transmitting a plurality of transition modified data signals (TMDS) associated with audio and video information (TMDS0, TMDS1, TMDS2), a TMDS clock signal and associated control and power signals, the active HMDI cable connection comprising:

a phase alignment element responsive to the plurality of TMDS information signals and the TMDS clock signal to generate a plurality of phase-aligned information signals;

an optical modulator responsive to the plurality of phase-aligned information signals generated by the phase alignment element to create a phase-amplitude modulated (PAM) optical information signal representative of the plurality of TMDS information signals;

a single optical fiber coupled at a first end thereof to the output of the optical modulator for supporting the propagation of the PAM optical information signal thereal ong;

a plurality of electrical signal conductors for transmitting the TMDS clock signal and a plurality of HMDI electrical control signals;

an optical-to-electrical (O/E) conversion element coupled to a second, opposing end of the single optical fiber for receiving the propagating PAM optical information signal and converting the received PAM optical information signal into an electrical representation;

an analog-to-digital conversion (ADC) element responsive to the electrical representation of the PAM optical signal and the received TMDS clock signal to recover therefrom the phase-aligned information signals; and a plurality of TMDS driver elements responsive to the phase-aligned information signals to generate the TMDS information signals.

2. An active HDMI cable connection as defined in claim 1 wherein the single optical fiber comprises a multimode optical fiber.

3. An active HDMI cable connection as defined in claim 1 wherein the single optical fiber comprises a single mode optical fiber.

4. An active HDMI cable connection as defined in claim 1 wherein the optical modulator comprises a Mach-Zehnder interferometer (MZI) and is further responsive to a continuous wave (CW) optical signal, wherein the plurality of phase-aligned information signals is applied as the electrical input to the MZI and modulates the CW optical signal to generate the PAM optical information signal.

5. An active HDMI cable connection as defined in claim 1 wherein the optical modulator comprises a vertical cavity surface-emitting laser (VCSEL) responsive to the plurality of phase-aligned information signals to generate the PAM optical information signal.

6. An active HDMI cable connection as defined in claim 1 wherein the optical modulator comprises:
- a digital-to-analog converter (DAC) responsive to the plurality of TMDS information signals and the TMDS clock signal to create an electrical PAM information signal; and
- an electrical-to-optical (E/O) conversion element responsive to the electrical PAM information signal for converting the electrical PAM information signal to the PAM optical information signal.

* * * * *

UNITED STATES PATENT AND TRADEMARK OFFICE
CERTIFICATE OF CORRECTION

PATENT NO.        : 8,340,529 B2
APPLICATION NO.   : 12/813562
DATED             : December 25, 2012
INVENTOR(S)       : Shastri et al.

Page 1 of 1

It is certified that error appears in the above-identified patent and that said Letters Patent is hereby corrected as shown below:

In the Claims:

Column 6, Claim 1, Line 38-40, please replace "transition modified data signals (TMDS)" with "transition minimized differential signaling (TMDS) information signals".

Column 6, Claim 1, line 42, please replace "HMDI" with "HDMI".

Column 6, Claim 1, line 49-50, please replace "phase-amplitude modulated (PAM)" with "pulse-amplitude modulated (PAM)".

Column 6, Claim 1, line 57, please replace "HMDI" with "HDMI".

Signed and Sealed this
Fifteenth Day of July, 2014

Michelle K. Lee
*Deputy Director of the United States Patent and Trademark Office*